United States Patent Office 2,837,573
Patented June 3, 1958

2,837,573
ETHERS AND ALCOHOLS VIA SULFUR DIOXIDE OXIDATION OF SULFIDES AND MERCAPTANS

Julian M. Mavity, Hinsdale, Ill., assignor to Universal Oil Products Company, Des Plaines, Ill., a corporation of Delaware No Drawing. Application January 14, 1955
Serial No. 481,973

7 Claims. (Cl. 260—614)

This invention relates to a process for preparing oxygen-containing organic compounds, and more particularly to a process for preparing oxygenated hydrocarbon derivatives from sulfur-containing organic compounds.

An object of this invention is to prepare oxygenated organic compounds.

A further object of this invention is to prepare oxygen-containing compounds such as alcohols and ethers by reacting the corresponding sulfur-containing compounds with sulfur dioxide.

One embodiment of the present invention resides in a process for preparing an oxygen-containing organic compound by treating an organic compound such as a mercaptan, sulfide or disulfide with sulfur dioxide, and recovering the resultant oxygen-containing organic compound.

A further embodiment resides in a process for preparing an oxygen-containing organic compound by treating a mercaptan, organic sulfide or disulfide with sulfur dioxide at a temperature in the range of from about 100° to about 350° C. and at a super-atmospheric pressure in the range of from about 2 to 500 atmospheres or higher, and recovering the resultant oxygen-containing organic compound.

A specific embodiment of the invention resides in a process for preparing ethyl alcohol by treating ethyl mercaptan with sulfur dioxide at a temperature in the range of from about 100° to 350° C. and at a super-atmospheric pressure in the range of from about 2 to 500 atmospheres, and recovering the resultant ethyl alcohol.

Other embodiments and objects relating to alternative sulfur-containing organic compounds will be found in the following further detailed description of the invention.

Oxygen-containing organic compounds such as alcohols and ethers, the uses of which are well known (e. g., ethyl ether being used as an anesthetic), may be prepared from the corresponding sulfur-containing organic compounds such as mercaptans, sulfides or disulfides by treating the latter compounds with sulfur dioxide at an elevated temperature and pressure. It is also contemplated within the scope of this invention that the process may be used as a step in the conversion of olefinic compounds to oxygenated compounds inasmuch as olefins readily add hydrogen sulfide to form mercaptans and/or sulfides when reacted in the presence of a proper catalyst such as solid phosphoric acid, etc. The mercaptan and/or sulfide may then be treated with sulfur dioxide to form the corresponding oxygenated compounds. In addition, the reaction of the present invention may also be utilized in conjunction with supplementary procedures for treating hydrocarbon mixtures which are contaminated by sulfur compounds to remove the sulfur, thereby "sweetening" said hydrocarbon mixtures.

The reaction of the present invention will proceed according to the equations hereinafter set forth:

$$2RSH + SO_2 \rightarrow 2ROH + 3S$$

$$2R_2S + SO_2 \rightarrow 2R_2O + 3S$$

$$2R_2S_2 + SO_2 \rightarrow 2R_2O + 5S$$

in which R may comprise either an alkyl, aryl, alkaryl, aralkyl or cycloalkyl radical.

Examples of sulfur-containing compounds which may be used in this invention include alkyl mercaptans such as methyl mercaptan, ethyl mercaptan, propyl mercaptan, isopropyl mercaptan, butyl mercaptan, isobutyl mercaptan, t-butyl mercaptan, pentyl mercaptan, etc.; aryl mercaptans such as phenyl mercaptan, etc.; alkaryl mercaptans such as methylphenyl mercaptan, p-ethylphenyl mercaptan, p-propylphenyl mercaptan, o-methylphenyl mercaptan, o-ethylphenyl mercaptan, tolyl mercaptan, etc.; aralkyl mercaptans such as benzyl mercaptan, p-methylbenzyl mercaptan, ethylbenzyl mercaptan, propylbenzyl mercaptan, etc.; cycloalkyl mercaptans such as cyclopentyl mercaptan, cyclohexyl mercaptan, cycloheptyl mercaptan, etc.; alkyl sulfides such as dimethyl sulfide, diethyl sulfide, dipropyl sulfide, diisopropyl sulfide, methyl ethyl sulfide, methyl propyl sulfide, methyl butyl sulfide, ethyl propyl sulfide, ethyl butyl sulfide, etc.; aryl sulfides such as diphenyl sulfide, dinaphthyl sulfide, etc.; alkaryl sulfides such as ditolyl sulfide, di(p-methylphenyl)sulfide, di(o-methylphenyl)sulfide, di(m-methylphenyl)sulfide, di(o-ethylphenylsulfide, di(p-ethylphenyl)sulfide, di(o-propylphenyl)sulfide, etc.; aralkyl sulfides such as dibenzyl sulfide, di(ethylbenzyl)sulfide, etc.; cycloalkyl sulfides such as dicyclopentyl sulfide, dicyclohexyl sulfide, dicycloheptyl sulfide, etc.; alkyl disulfides such as dimethyl disulfide, diethyl disulfide, dipropyl disulfide, diisopropyl disulfide, methyl ethyl disulfide, methyl propyl disulfide, methyl butyl disulfide, ethyl propyl disulfide, ethyl butyl disulfide, etc.; aryl disulfides such as diphenyl disulfide, dinaphthyl disulfide, etc.; alkaryl disulfides such as ditolyl disulfide, di(p-methylphenyldisulfide, di(o-methylphenyl)disulfide, di(m-methylphenyldisulfide, di(o-ethylphenyl)disulfide, di(p-ethylphenyl)disulfide, di(o-propylphenyl)disulfide, etc.; aralkyl disulfides such as dibenzyl disulfide, di(ethylbenzyl)disulfide, etc.; cycloalkyl disulfides such as dicyclopentyl disulfide, dicyclohexyl disulfide, dicycloheptyl disulfide, etc.

The reaction conditions under which the process of this invention proceeds will depend upon the particular sulfur-containing organic compound undergoing oxygenation. However, elevated temperatures in the range of from about 100° to about 350° C. are needed. It is also desirable that super-atmospheric pressures in the range of from about 2 atmospheres to about 500 atmospheres be used. Generally speaking, temperatures above 350° C. are to be avoided due to the fact that reactions involving the participation of free sulfur along with the formation of olefins and/or other unwanted side products results from the use of excessive temperatures.

It is also contemplated within the scope of this invention that appropriate catalysts may be used to speed up the oxygenation of the sulfur-containing organic compounds, said catalysts including, but not limited to, contact catalysts such as metal oxides (e. g. aluminum oxide, silica oxide, etc.) metal sulfides, noble metal catalysts composited on an appropriate support, etc.

The process of this invention may be effected in any suitable manner and may comprise either a batch or continuous type operation. When a batch type operation is used, a quantity of the starting material comprising either an organic mercaptan, sulfide, or disulfide is placed in a suitable reaction vessel along with sulfur dioxide and heated to the desired reaction temperature. After a predetermined length of time, the reaction vessel and the contents thereof are allowed to cool to room temperature, the unreacted sulfur dioxide bled off and the ether or alcohol separated from the unreacted mercaptan, sulfide or disulfide by conventional means, for example, fractional distillation, etc.

Another method of operation of the present process is of the continuous type. In this type, the mercaptan, sulfide or disulfide along with sulfur dioxide is continuously charged to a reaction vessel maintained at the desired operating conditions of temperature and pressure. The reaction zone may be an unpacked vessel or coil, or it may contain an adsorbent packing material such as fire brick, alumina, dehydrated bauxite, and the like. The reaction product comprising either an alcohol or ether is continuously withdrawn, separated from the reactor effluent and purified by conventional means hereinbefore set forth, while the unreacted starting material is recycled for use as a portion of the starting material.

If so desired, the catalysts hereinbefore enumerated may be used in either the batch type or continuous type operation.

The following examples are given to illustrate the process of this invention which, however, are not intended to limit the generally broad scope of the present invention in strict accordance therewith.

*Example I*

150 g. of ethyl mercaptan is placed in a reaction vessel provided with heating and stirring means. The vessel is heated to approximately 200° C. while adding sulfur dioxide gas until a pressure of approximately 100 atmospheres has been reached. The vessel and the contents are maintained at this temperature for a period of approximately 4 hours after which said vessel and contents are allowed to cool to room temperature. The reaction mixture is subjected to fractional distillation and the cut boiling at approximately 77–80° C., comprising ethyl alcohol, is separated out and purified.

*Example II*

100 g. of propyl sulfide is placed in a reaction vessel equipped with heating and stirring means. The vessel is sealed and heated to a temperature of approximately 225° C. while sulfur dioxide is added to the vessel until a pressure of approximately 30 atmospheres is reached. After a period of approximately 4 hours, the flask and contents thereof are cooled to room temperature and the dipropyl ether boiling at approximaely 91° C. is separated from the unreacted propyl sulfide and other reaction products and purified.

I claim as my invention:

1. A process for the preparation of oxygen-containing organic compounds selected from the group consisting of alcohols and ethers which comprises treating an organic compound selected from the group consisting of mercaptans, sulfides and disulfides, with sulfur dioxide, at a temperature in the range of from about 100° to 350° C., and recovering the resultant oxygen-containing organic compound.

2. A process for the preparation of an oxygen-containing organic compound selected from the group consisting of alcohols and ethers which comprises treating an organic compound selected from the group consisting of mercaptans, sulfides and disulfides with sulfur dioxide at a temperature in the range of from about 100° to 350° C., and at a super-atmospheric pressure in the range of from about 2 to about 500 atmospheres, and recovering the resultant oxygen-containing organic compound.

3. A process for the preparation of ethyl alcohol which comprises treating ethyl mercaptan with sulfur dioxide at a temperature in the range of from about 100° to 350° C., and at a super-atmospheric pressure in the range of from about 2 to about 500 atmospheres, and recovering the resultant ethyl alcohol.

4. A process for the preparation of diethyl ethyl ether which comprises treating diethyl sulfide with sulfur dioxide at a temperature in the range of from about 100° to 350° C. and at a super-atmospheric pressure in the range of from about 2 to about 500 atmospheres, and recovering the resultant diethyl ether.

5. A process for the preparation of diethyl ether which comprises treating diethyl disulfide with sulfur dioxide at a temperature in the range of from about 100° to 350° C. and at a super-atmospheric pressure in the range of from about 2 to about 5 atmospheres, and recovering the resultant diethyl ether.

6. A process for the preparation of butyl alcohol which comprises treating butyl mercaptan with sulfur dioxide at a temperature in the range of from about 100° to 350° C. and at a super-atmospheric pressure in the range of from about 2 to about 5 atmospheres, and recovering the resultant butyl alcohol.

7. A process for the preparation of dipropyl ether which comprises treating propyl sulfide with sulfur dioxide at a temperature in the range of from about 100° to 350° C. and at a super-atmospheric pressure in the range of from about 2 to about 50 atmospheres, and recovering the resultant dipropyl ether.

References Cited in the file of this patent

UNITED STATES PATENTS

| | | |
|---|---|---|
| 1,855,486 | Morrell et al. | Apr. 26, 1932 |
| 1,955,722 | Ahlqvist | Apr. 24, 1934 |
| 2,553,576 | Grosse et al. | May 22, 1951 |

OTHER REFERENCES

Wagner et al.; JACS, vol. 53, pp. 3407–13, 1931.

Gilman: "Organic Chemistry," vol. 1, pp. 851, 888, 889, 2nd ed., 1943.